(12) United States Patent
Ferguson et al.

(10) Patent No.: US 10,310,509 B1
(45) Date of Patent: *Jun. 4, 2019

(54) DETECTING SENSOR DEGRADATION BY ACTIVELY CONTROLLING AN AUTONOMOUS VEHICLE

(71) Applicant: Waymo LLC, Mountain View, CA (US)

(72) Inventors: David I. Ferguson, San Francisco, CA (US); Jiajun Zhu, Palo Alto, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 15/892,684

(22) Filed: Feb. 9, 2018

Related U.S. Application Data

(63) Continuation of application No. 15/415,037, filed on Jan. 25, 2017, now Pat. No. 9,927,813, which is a continuation of application No. 15/018,205, filed on Feb. 8, 2016, now Pat. No. 9,594,379, which is a continuation of application No. 13/630,054, filed on Sep. 28, 2012, now Pat. No. 9,274,525.

(51) Int. Cl.
*G05D 1/00* (2006.01)
*G05D 1/02* (2006.01)
*G01C 21/28* (2006.01)

(52) U.S. Cl.
CPC ............ *G05D 1/024* (2013.01); *G01C 21/28* (2013.01); *G05D 1/0088* (2013.01)

(58) Field of Classification Search
CPC . G01S 7/4972; G01S 7/52004; G05D 1/0246; G05D 1/00; G05D 1/024; G05D 1/0251; G05D 1/0255; G05D 1/0257; B60K 31/0008
See application file for complete search history.

(56) References Cited

U.S. PATENT DOCUMENTS

| | | | |
|---|---|---|---|
| 5,825,464 A * | 10/1998 | Feichtner | G01S 7/4813 356/4.02 |
| 7,813,888 B2 | 10/2010 | Vian et al. | |
| 7,991,550 B2 * | 8/2011 | Zeng | G01S 7/4026 340/435 |
| 8,195,358 B2 * | 6/2012 | Anderson | G05D 1/0287 340/988 |
| 8,229,618 B2 | 7/2012 | Tolstedt et al. | |
| 8,560,165 B2 | 10/2013 | Salman et al. | |

(Continued)

*Primary Examiner* — Thomas Ingram
(74) *Attorney, Agent, or Firm* — Botos Churchill IP Law

(57) ABSTRACT

Methods and systems are disclosed for determining sensor degradation by actively controlling an autonomous vehicle. Determining sensor degradation may include obtaining sensor readings from a sensor of an autonomous vehicle, and determining baseline state information from the obtained sensor readings. A movement characteristic of the autonomous vehicle, such as speed or position, may then be changed. The sensor may then obtain additional sensor readings, and second state information may be determined from these additional sensor readings. Expected state information may be determined from the baseline state information and the change in the movement characteristic of the autonomous vehicle. A comparison of the expected state information and the second state information may then be performed. Based on this comparison, a determination may be made as to whether the sensor has degraded.

20 Claims, 12 Drawing Sheets

(56) References Cited

U.S. PATENT DOCUMENTS

| | | | | |
|---|---|---|---|---|
| 8,630,806 B1* | 1/2014 | Zhu | ................... | B60W 30/16 |
| | | | | 701/408 |
| 2004/0167717 A1* | 8/2004 | Buchanan | .......... | B60K 31/0008 |
| | | | | 701/301 |
| 2005/0192727 A1 | 9/2005 | Shostak et al. | | |
| 2005/0240328 A1* | 10/2005 | Shirato | ................. | B62D 1/286 |
| | | | | 701/41 |
| 2008/0162027 A1* | 7/2008 | Murphy | ............... | B60W 50/14 |
| | | | | 701/117 |
| 2009/0030569 A1* | 1/2009 | Thorne | ............... | G05D 1/0242 |
| | | | | 701/25 |
| 2011/0130916 A1* | 6/2011 | Mayer | ................... | G07C 5/008 |
| | | | | 701/31.4 |
| 2012/0206575 A1* | 8/2012 | Massanell | ............ | G01S 7/4972 |
| | | | | 348/46 |
| 2013/0030756 A1* | 1/2013 | Bielski | ............... | G01D 5/24471 |
| | | | | 702/151 |
| 2013/0184929 A1* | 7/2013 | Salman | ............. | G05B 23/0283 |
| | | | | 701/31.5 |
| 2013/0208121 A1* | 8/2013 | Wu | ..................... | G08G 1/0175 |
| | | | | 348/149 |
| 2013/0218398 A1* | 8/2013 | Gandhi | .................. | B60R 16/02 |
| | | | | 701/31.1 |
| 2013/0335553 A1* | 12/2013 | Heger | ............... | B62D 15/0285 |
| | | | | 348/118 |

* cited by examiner

DETECTING SENSOR DEGRADATION BY ACTIVELY CONTROLLING AN AUTONOMOUS VEHICLE

CROSS-REFERENCE TO RELATED APPLICATIONS

The present application is a continuation of U.S. patent application Ser. No. 15/415,037, filed Jan. 25, 2017, which is a continuation of U.S. patent application Ser. No. 15/018,205, filed Feb. 8, 2016, now issued as U.S. Pat. No. 9,594,379 issued on Mar. 14, 2017, which is a continuation of U.S. patent application Ser. No. 13/630,054, filed Sep. 28, 2012, now issued as U.S. Pat. No. 9,274,525 issued on Mar. 1, 2016, the disclosure of which is incorporated herein by reference.

BACKGROUND

An autonomous vehicle may use various computing systems to aid in the transport of passengers from one location to another. In addition, the autonomous vehicle may require an initial input or continuous input from an operator, such as a pilot, driver, or passenger. Other autonomous systems, for example autopilot systems, may be used only when the system has been engaged, which permits the operator to switch from a manual mode (where the operator exercises a high degree of control over the movement of the autonomous vehicle) to an autonomous mode (where the autonomous vehicle essentially drives itself) to modes that lie somewhere in between.

The autonomous vehicle may be equipped with various types of sensors in order to detect objects in its environment. For example, the autonomous vehicles may include such sensors as lasers, sonar, radar, cameras, and other sensors that scan and record data from the autonomous vehicle's environment. Sensor data from one or more of these sensors may be used to detect objects and their respective characteristics (position, shape, heading, speed, etc.). This detection and identification is a critical function for the safe operation of the autonomous vehicle.

To navigate an environment confidently and precisely, the autonomous vehicle may rely on a prior stored electronic representation of the environment (e.g., a roadway, a highway, etc.). The electronic representation of the environment may be considered a "map" that identifies such features as lane markings, lane edges, k-rail concrete barriers, lane dividers, road medians, traffic safety cones, and other such features. The autonomous vehicle may store the map for both complex and simple environments.

However, the sensors on the autonomous vehicle may experience one or more problems, such as failure, inaccurate readings, or other such problems. When the sensor has a problem, the sensor may be unusable for determining whether there are objects, such as other vehicles, proximate to the autonomous vehicle. Having a sensor failure decreases the ability of the autonomous vehicle to navigate its environment confidently and precisely.

BRIEF SUMMARY

An apparatus and method are disclosed. In one embodiment, the apparatus includes a computer-readable memory that stores a change in a movement characteristic of an autonomous vehicle, a sensor configured to detect an object in a driving environment of the autonomous vehicle, and a processor, in communication with the sensor and the computer-readable memory. The processor may be configured to receive a first sensor reading from the sensor based on a first detection of the object in the driving environment, determine first state information for the object based on the received first sensor reading, change the movement characteristic of the autonomous vehicle based on the stored change in the movement characteristic of the autonomous vehicle, and determine expected state information based on the first state information and the change in the movement characteristic of the autonomous vehicle. The processor may also be configured to receive a second sensor reading from the sensor based on a second detection of the object in the driving environment, determine second state information for the object based on the received second sensor reading, and determine sensor degradation in the sensor by comparing the second state information with the expected state information.

In another embodiment of the apparatus, the change in the movement characteristic of the autonomous vehicle comprises one of changing the autonomous vehicle's position, changing the autonomous vehicle's speed, or changing the autonomous vehicle's heading.

In a further embodiment of the apparatus, the sensor comprises one of a camera, a radar detection unit, or a laser sensor.

In yet another embodiment of the apparatus, the object is a moving object.

In yet a further embodiment of the apparatus, the object is a static object.

In another embodiment of the apparatus, the processor is configured to change the movement characteristic of the autonomous vehicle by increasing a speed of the autonomous vehicle by a predetermined amount.

In a further embodiment of the apparatus, the processor is configured to change the movement characteristic of the autonomous vehicle by changing a heading of the autonomous vehicle.

In yet another embodiment of the apparatus, the first state information comprises a distance from the object relative to the autonomous vehicle.

In yet a further embodiment of the apparatus, the processor is further configured to determine a deviation value from comparing the second state information with the expected state information, and the processor determines sensor degradation in the sensor based on a comparison of the determined deviation value with a deviation threshold value.

In another embodiment of the apparatus, the processor is further configured to perform an action when the determined deviation value exceeds the deviation threshold value.

In one embodiment of the method, the method includes receiving, with a processor in communication with a sensor, a first sensor reading from the based on a first detection of an object in a driving environment, determining, with the processor, first state information for the object based on the received first sensor reading, and changing a movement characteristic of the autonomous vehicle based on the stored change in the movement characteristic of the autonomous vehicle. The method may also include determining, with the processor, expected state information based on the first state information and the change in the movement characteristic of the autonomous vehicle and receiving, with the processor, a second sensor reading from the sensor based on a second detection of the object in the driving environment. The method may further include determining, with the processor, second state information for the object based on the received second sensor reading, and determining, with the processor, sensor degradation in the sensor by comparing the second state information with the expected state information.

In another embodiment of the method, the change in the movement characteristic of the autonomous vehicle comprises one of changing the autonomous vehicle's position, changing the autonomous vehicle's speed, or changing the autonomous vehicle's heading.

In a further embodiment of the method, the sensor comprises one of a camera, a radar detection unit, or a laser sensor.

In yet another embodiment of the method, the object is a moving object.

In yet a further embodiment of the method, the object is a static object.

In another embodiment of the method, the method further includes changing the movement characteristic of the autonomous vehicle by increasing a speed of the autonomous vehicle by a predetermined amount.

In a further embodiment of the method, the method includes changing the movement characteristic of the autonomous vehicle by changing a heading of the autonomous vehicle.

In yet another embodiment of the method, the first state information comprises a distance from the object relative to the autonomous vehicle.

In yet a further embodiment of the method, the method includes determining, with the processor, a deviation value from comparing the second state information with the expected state information, and determining, with the processor, sensor degradation in the sensor based on a comparison of the determined deviation value with a deviation threshold value.

In another embodiment of the method, the method includes performing an action when the determined deviation value exceeds the deviation threshold value.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
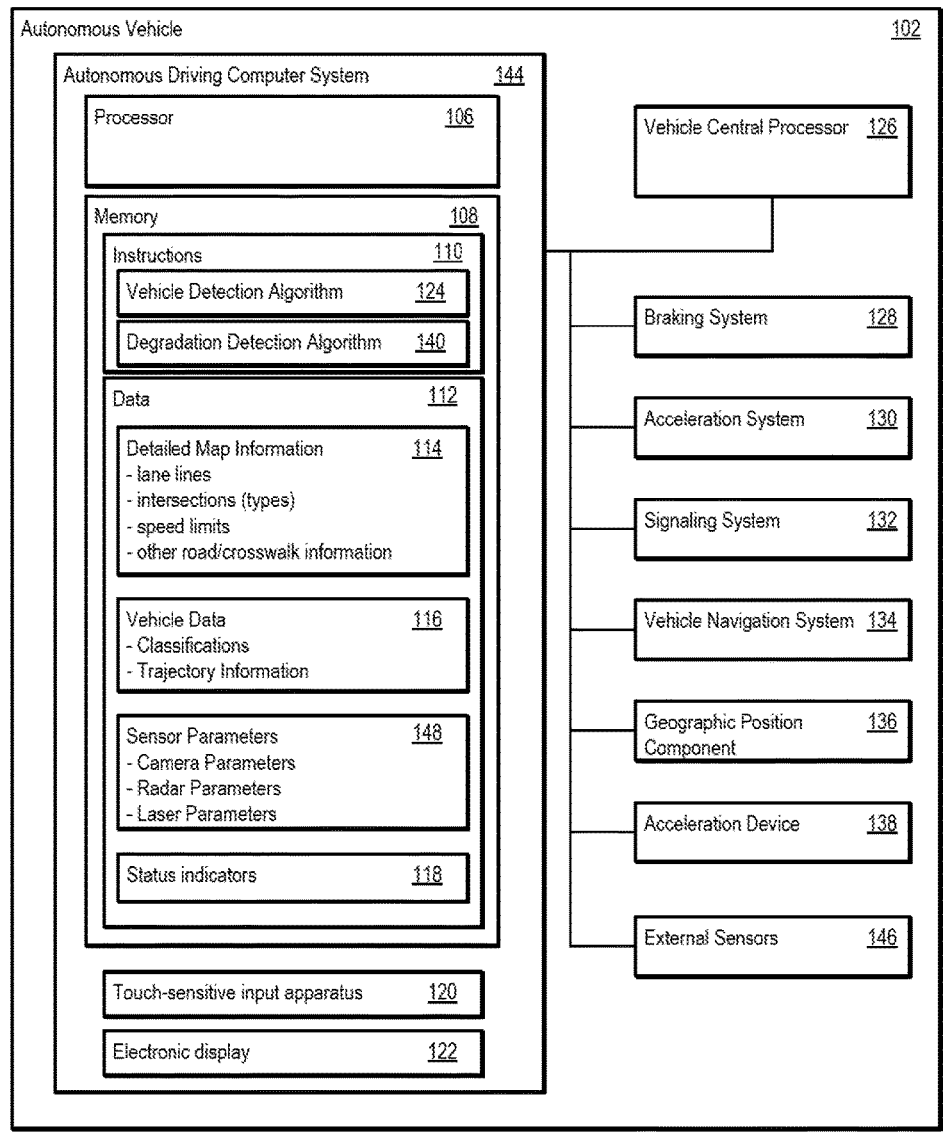
FIG. 1 illustrates an example of an autonomous vehicle configured to detect sensor degradation in one or more sensors of the autonomous vehicle according to aspects of the disclosure.

This disclosure provides for systems and methods for determining sensor degradation in one or more sensor of an autonomous vehicle by actively controlling the autonomous vehicle. In particular, this disclosure provides for introducing computer-controlled movements into the motion of the autonomous vehicle and then determining whether the sensors of the autonomous vehicle provide sensor readings that correlate to those movements.

In one embodiment, the autonomous vehicle may introduce these movements to determine whether one or more sensors are operating within normal or preferred parameters by comparing the sensor readings of the one or more sensors with other moving objects (e.g., vehicles proximate to the autonomous vehicle). For example, the autonomous vehicle may be configured to test a radar detection unit in this manner Specifically, if the radar detection unit detects a vehicle in front of the autonomous vehicle and the autonomous vehicle is turned slightly to the left or right, the computing systems on the autonomous vehicle would expect that the lateral speed of the corresponding radar target for the observed vehicle would move in the opposite direction (i.e., right or left) corresponding to the slight turn of the autonomous vehicle, with a magnitude relative to the distance between the observed vehicle and the autonomous vehicle.

To confirm that the radar detection unit is operating within normal or preferred operational parameters, a small perturbation may be introduced or added to the autonomous vehicle yaw rate (e.g., a slight turn of the steering wheel). The computing systems of the autonomous vehicle may then check if the lateral speed of observed vehicles returned by the radar detection unit is within a range of expected lateral speeds of the observed vehicles. If the observed lateral speed(s) are not within the range of expected lateral speed (s), then the computing systems of the autonomous vehicle may identify sensor degradation or determine that the radar detection unit is operating outside of normal or preferred operating parameters.

The autonomous vehicle may also be configured to perform these tests using non-moving features of the driving environment. For example, the autonomous vehicle may be configured to perform these tests using laser-based sensors. In this regard, the autonomous vehicle may be maneuvered into areas where the stored map of the driving environment has a high degree of accuracy in the geometry of the driving environment or laser intensity values, and the computing systems of the autonomous vehicle may be configured confirm that the sensor readings of the laser sensor match the geometry and/or laser intensity values. In this regard, the computing systems of the autonomous vehicle may be configured to compare the laser sensor readings with static features of the driving environment, such as lane markers, k-rail concrete barriers, or other static features. In addition, certain features, such as k-rail concrete barriers or billboards, may be used to compare geometry readings from the laser sensor, whereas other features, such as lane reflectors or lane markers, may be used to compare intensity values from the laser sensor. In addition, the laser sensor may be evaluated as a whole (e.g., the laser sensor is operating within expected parameters) and/or each beam of the laser sensor may be evaluated individually.

FIG. 1 illustrates an autonomous vehicle 102 configured to determine sensor degradation in one or more of its sensors. The autonomous vehicle 102 may be configured to operate autonomously, e.g., drive without the assistance of a human driver. Moreover, the autonomous vehicle 102 may be configured to detect various objects and determine whether the detected object is a vehicle.

While certain aspects of the disclosure are particularly useful in connection with specific types of vehicles, the autonomous vehicle 102 may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys.

In one embodiment, the autonomous driving computer system 144 may include a processor 106 and a memory 108. The autonomous driving computer system 144 may also include other components typically present in a general purpose computer.

The memory 108 may store information accessible by the processor 106, such as instructions 110 and data 112 that may be executed or otherwise used by the processor 106. The memory 108 may be of any type of memory operative to store information accessible by the processor 106, including a computer-readable medium, or other medium that stores data that may be read with the aid of an electronic device. Examples of the memory 108 include, but are not limited, a hard-drive, a memory card, read-only memory ("ROM"), random-access memory ("RAM"), digital video disc ("DVD"), or other optical disks, as well as other write-capable and read-only memories. Systems and methods may include different combinations of the foregoing, whereby different portions of the instructions and data are stored on different types of media.

The instructions 110 may be any set of instructions that may be executed directly (such as machine code) or indirectly (such as scripts) by the processor 106. For example, the instructions 110 may be stored as computer code on the computer-readable medium. In that regard, the terms "instructions" and "programs" may be used interchangeably herein. The instructions 110 may be stored in object code format for direct processing by the processor 106, or in any other computer language including scripts or collections of independent source code modules that are interpreted on demand or compiled in advance. Functions, methods and routines of the instructions 110 are explained in more detail below.

The data 112 may be retrieved, stored, or modified by processor 106 in accordance with the instructions 110. For instance, although the disclosed embodiments not limited by any particular data structure, the data 112 may be stored in computer registers, in a relational database as a table having a plurality of different fields and records, XML documents, flat files, or in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 112 may comprise any information sufficient to identify the relevant information, such as numbers, descriptive text, proprietary codes, references to data stored in other areas of the same memory or different memories (including other network locations) or information that is used by a function to calculate the relevant data.

The processor 106 may be any conventional processor, including Reduced Instruction Set Computing ("RISC") processors, Complex Instruction Set Computing ("CISC") processors, or combinations of the foregoing. Alternatively, the processor may be a dedicated device such as an applicant-specific integrated circuit ("ASIC").

Although FIG. 1 functionally illustrates the processor 106, the memory 108, and other elements of the autonomous driving computer system 144 as being within the same block, it will be understood by those of ordinary skill in the art that the processor 106 and the memory 108 may actually comprise multiple processors and memories that may or may not be stored within the same physical housing. For example, the memory 108 may be a hard drive or other storage media located in a housing different from that of the autonomous driving computer system 144.

Accordingly, references to a processor or computer will be understood to include references to a collection of processors or computers or memories that may or may not operate in parallel. Rather than using a single processor to perform the acts described herein, some of the components, such as steering components and deceleration components, may each have their own processor that only performs calculations related to the component's specific function.

In various embodiments described herein, the processor 106 may be located remotely from the autonomous vehicle 102 and may communicate with the autonomous vehicle wirelessly. In other aspects, some of the processes described herein are executed on a processor disposed within the autonomous vehicle 102 and others by a remote processor, including taking the acts necessary to execute a single maneuver.

The autonomous driving computer system 144 may include all of the components normally used in connection with a computer, such as a central processing unit (CPU), a memory (e.g., RAM and internal hard drives) storing data 112 and instructions such as an Internet browser or other software application, an electronic display 122 (e.g., a monitor having a screen, a small liquid crystal display ("LCD") touch-screen or any other electrical device that is operable to display information), one or more user input devices (e.g., a mouse, keyboard, touch screen and/or microphone), as well as various sensors (e.g., a video camera) for gathering the explicit (e.g., a gesture) or implicit (e.g., "the person is asleep") information about the states and desires of a person.

The autonomous vehicle 102 may also include a geographic position component 136 in communication with the autonomous driving computer system 144 for determining the geographic location of the autonomous vehicle 102. For example, the geographic position component 136 may include a Global Positioning System ("GPS") receiver to determine the autonomous vehicle's 102 latitude, longitude and/or altitude position. Other location systems such as laser-based localization systems, inertial-aided GPS, or camera-based localization may also be used to identify the location of the vehicle. The location of the autonomous vehicle 102 may include an absolute geographical location, such as latitude, longitude, and altitude as well as relative location information, such as location relative to other vehicles immediately around it which can often be determined with less noise than absolute geographical location.

The geographic position component 136 may also include other devices in communication with the autonomous driving computer system 144, such as an accelerometer, gyroscope or another direction/speed detection device 138 to determine the direction and speed of the vehicle or changes thereto. By way of example only, the geographic position component 136 may determine its pitch, yaw or roll (or changes thereto) relative to the direction of gravity or a plane perpendicular thereto. The geographic position component 136 may also track increases or decreases in speed and the direction of such changes. The location and orientation data as set forth herein may be provided automatically to the user, the autonomous driving computer 144, the vehicle central processor 126, other computers and combinations of the foregoing.

The autonomous driving computer system 144 may control the direction and speed of the autonomous vehicle 102 by controlling various components. By way of example, if the autonomous vehicle 102 is operating in a completely autonomous mode, the autonomous driving computer system 144 may cause the autonomous vehicle 102 to accelerate via the acceleration system 130 (e.g., by increasing fuel or other energy provided to the engine), decelerate via the braking system 128 (e.g., by decreasing the fuel supplied to the engine or by applying brakes) and change direction (e.g., by turning the front two wheels). The autonomous driving computer system 144 may also control one or more systems, such as the signaling system 130, when controlling the acceleration system 130 and/or the braking system 128.

The autonomous driving computer system 144 may also control one or more status indicators 118, which may convey the status of the autonomous vehicle 102 and its components to a passenger. For example, the autonomous vehicle 102 may be equipped with an electronic display 122 for displaying information relating to the overall status of the vehicle, particular sensors, or information about or from the autonomous driving computer system 144. The electronic display 122 may display computer-generated images of the vehicle's surroundings including, for example, the status of the autonomous driving computer system 144, the autonomous vehicle 102 itself, roadways, intersections, as well as other objects and information.

The autonomous driving computer system 144 may use visual or audible cues to indicate whether it is obtaining valid data from one or more sensors, whether a passenger or the autonomous driving computer system 144 is partially or completely controlling the direction or speed of the autonomous vehicle 102 or both, such as whether there are any errors, etc. In addition, the autonomous driving computer system 144 may also have external indicators which indicate whether, at the moment, a human or an automated system is in control of the vehicle, that are readable by humans, other computers, or both.

The autonomous driving computer system 144 may also communicate with other components of the autonomous vehicle 102. For example, the autonomous driving computer system 144 may communicate with a vehicle central processor 126. The autonomous driving computer system 144 may also send and receive information from the various systems of the autonomous vehicle 102. Communicating with the various systems may include communicating with the braking system 128, the acceleration system 130, the signaling system 132, and the vehicle navigation system 134. Communications with these systems may facilitate the control of the movement, speed, etc. of the autonomous vehicle 102. In addition, when engaged, autonomous driving computer system 144 may control some or all of these functions of the autonomous vehicle 102 and thus be fully or partially autonomous. Although various systems and the autonomous driving computer system 144 are shown within the autonomous vehicle 102, these systems and components may be external to the autonomous vehicle 102 or physically separated by large distances.

The autonomous vehicle 102 may also include one or more sensors 146 for detecting objects external to it, such as other vehicles, obstacles in the roadway, traffic signals, signs, trees, etc. The sensors 146 may include lasers, sonar, radar, cameras or any other detection devices. The lasers may include commercially available lasers such as the Velodyne HDL-64 or other models. For example, where the autonomous vehicle 102 is a small passenger car, the small passenger car may include a laser mounted on the roof or other convenient location. In one aspect, the laser may measure the distance between the autonomous vehicle 102 and the object surfaces facing the autonomous vehicle 102 by spinning on its axis and changing its pitch.

The autonomous vehicle 102 may also include various radar detection units, such as those used for adaptive cruise control systems. The radar detection units may be located on the front and back of the car as well as on either side of the front bumper. In another example, a variety of cameras may be mounted on the autonomous vehicle 102 at known distances from one another. In this manner, the parallax from the different images may be used to compute the distance to various objects captured by the one or more cameras. These sensors may assist the vehicle in responding to its environment to maximize safety for passengers as well as objects or people in the environment.

Figure 3:
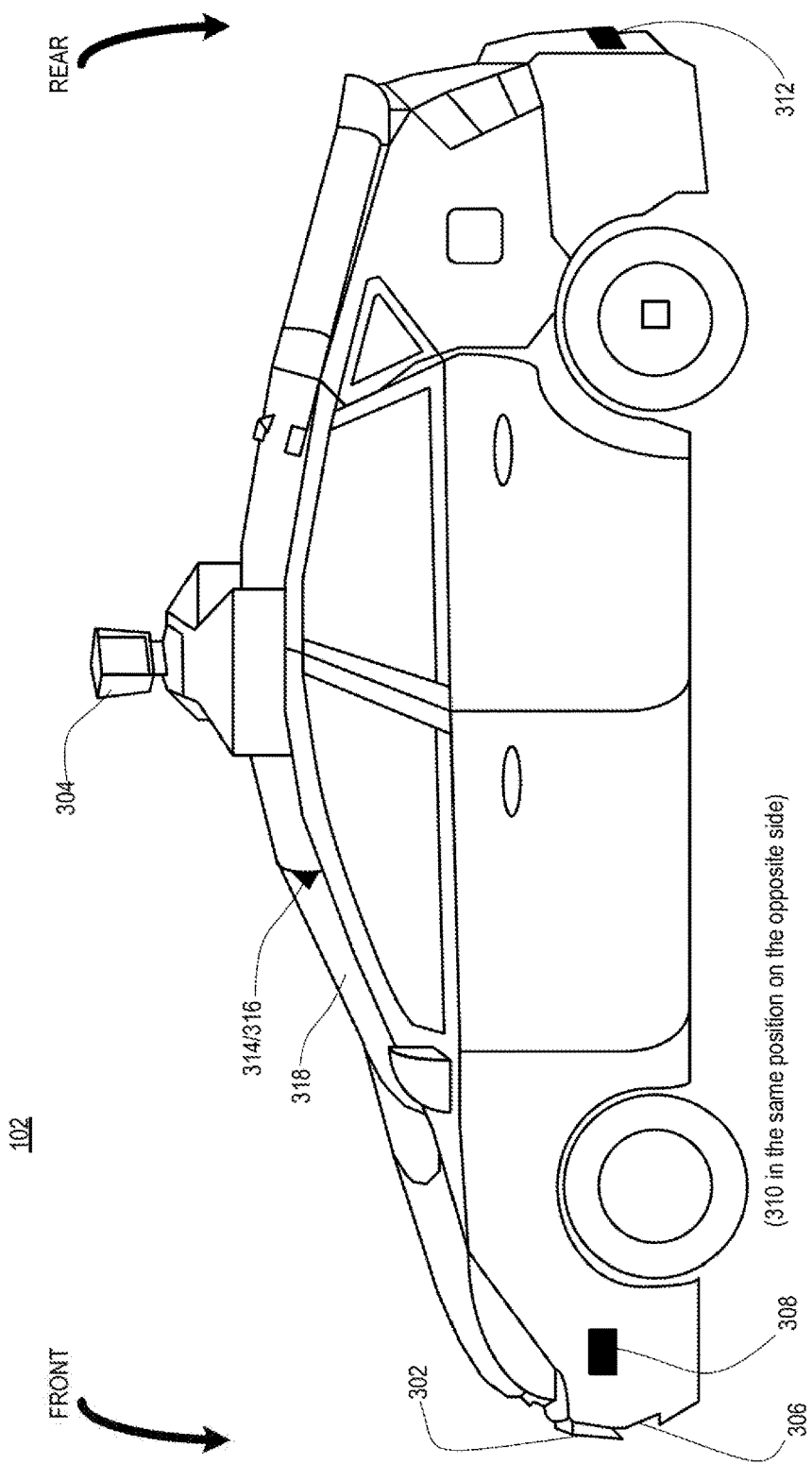
FIG. 3 illustrates an example of the placement of the one or more sensors of the autonomous vehicle according to aspects of the disclosure.

FIG. 3 illustrates one example of the autonomous vehicle 102 and the placement of its one or more sensors. The autonomous vehicle 102 may include lasers 302 and 304, for example, mounted on the front and top of the autonomous vehicle 102, respectively. The laser 302 may have a range of approximately 150 meters, a thirty degree vertical field of view, and approximately a thirty degree horizontal field of view. The laser 304 may have a range of approximately 50-80 meters, a thirty degree vertical field of view, and a 360 degree horizontal field of view. The lasers 302-304 may provide the autonomous vehicle 102 with range and intensity information that the processor 106 may use to identify the location and distance of various objects. In one aspect, the lasers 302-304 may measure the distance between the vehicle and object surfaces facing the vehicle by spinning on its axes and changing their pitch. Other lasers with different ranges and fields of view may also be used.

The autonomous vehicle 102 may also include various radar detection units, such as those used for adaptive cruise control systems. The radar detection units may be located on the front and back of the car as well as on either side of the front bumper. As shown in the example of FIG. 3, the autonomous vehicle 102 includes radar detection units 306-312 located on the side (only one side being shown), front and rear of the vehicle. Each of these radar detection units 306-312 may have a range of approximately 200 meters for an approximately 18 degree field of view as well as a range of approximately 60 meters for an approximately 56 degree field of view. Again other radar detection units with different ranges and fields of view may also be used.

In another example, a variety of cameras may be mounted on the autonomous vehicle 102. The cameras may be mounted at predetermined distances so that the parallax from the images of two or more cameras may be used to compute the distance to various objects. As shown in FIG. 3, the autonomous vehicle 102 may include two cameras 314-316 mounted under a windshield 318 near the rear view mirror (not shown). The camera 314 may include a range of approximately 200 meters and an approximately 30 degree horizontal field of view, while the camera 316 may include a range of approximately 100 meters and an approximately 60 degree horizontal field of view. Other cameras with different ranges and fields of view may also be used.

Figure 4A:
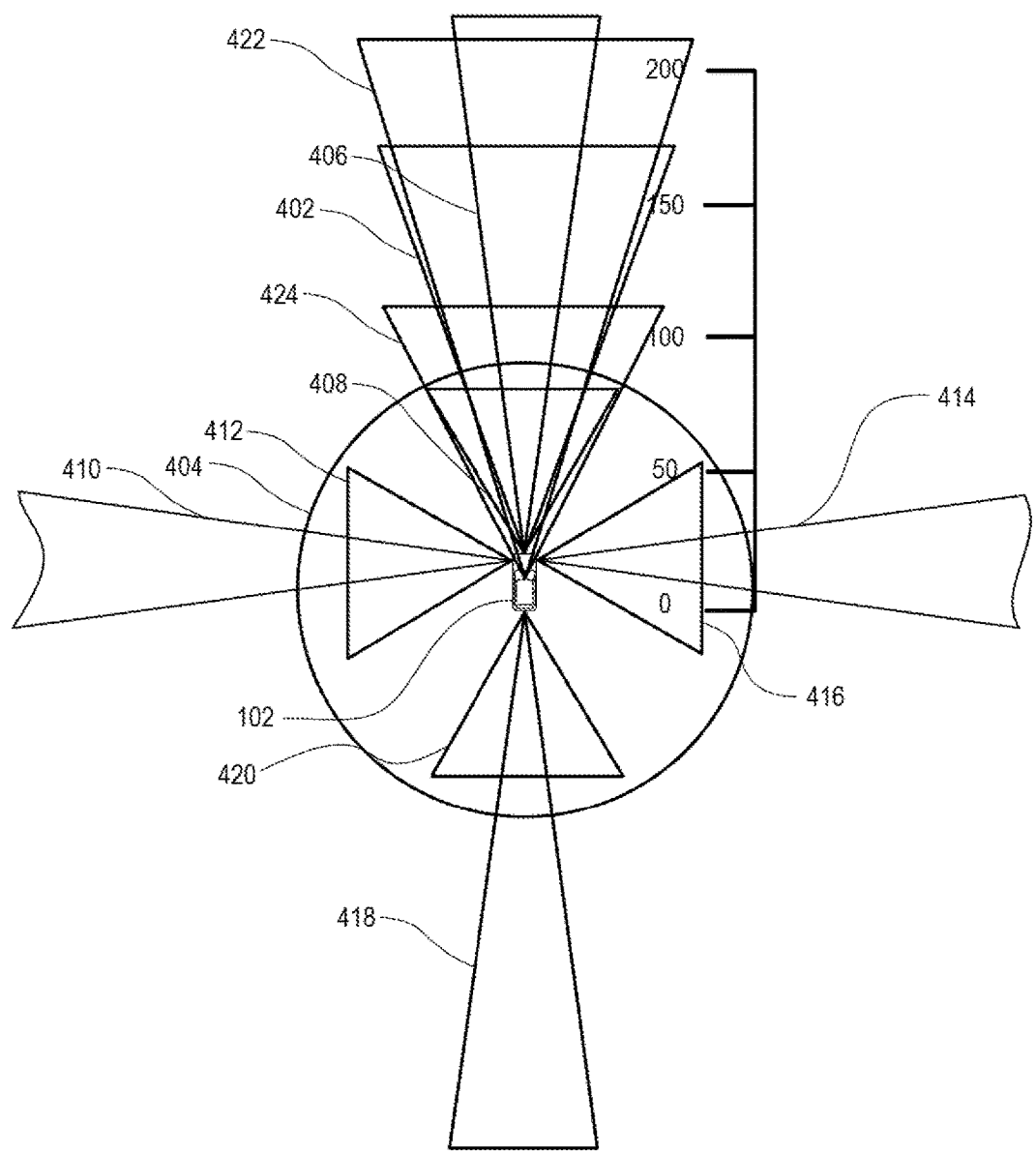
FIGS. 4A-4D illustrates various views of the approximate sensor fields of the various sensors of the autonomous vehicle according to aspects of the disclosure.

Each sensor may be associated with a particular sensor field defined by the ranges and fields of view for which the sensor may be used to detect objects. FIG. 4A is a top-down view of the approximate sensor fields of the various sensors. FIG. 4B depicts the approximate sensor fields 402 and 404 for the lasers 302 and 304, respectively based on the fields of view for these sensors. In this example, the sensor field 402 includes an approximately 30 degree horizontal field of view for approximately 150 meters, and the sensor field 404 includes a 360-degree horizontal field of view for approximately 80 meters.

Figure 4D:
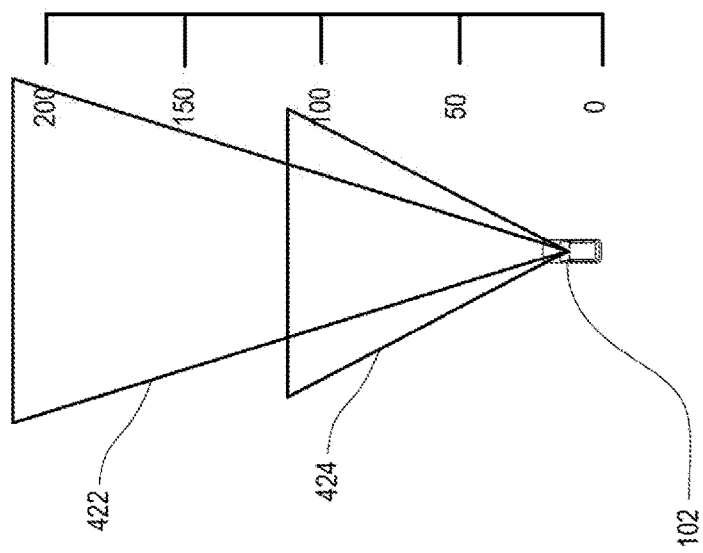
Figure 4B:
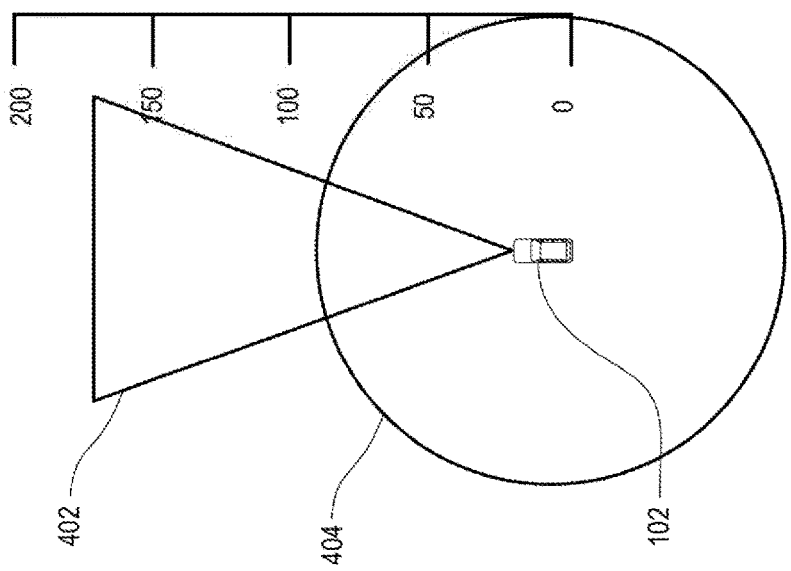
Figure 4C:
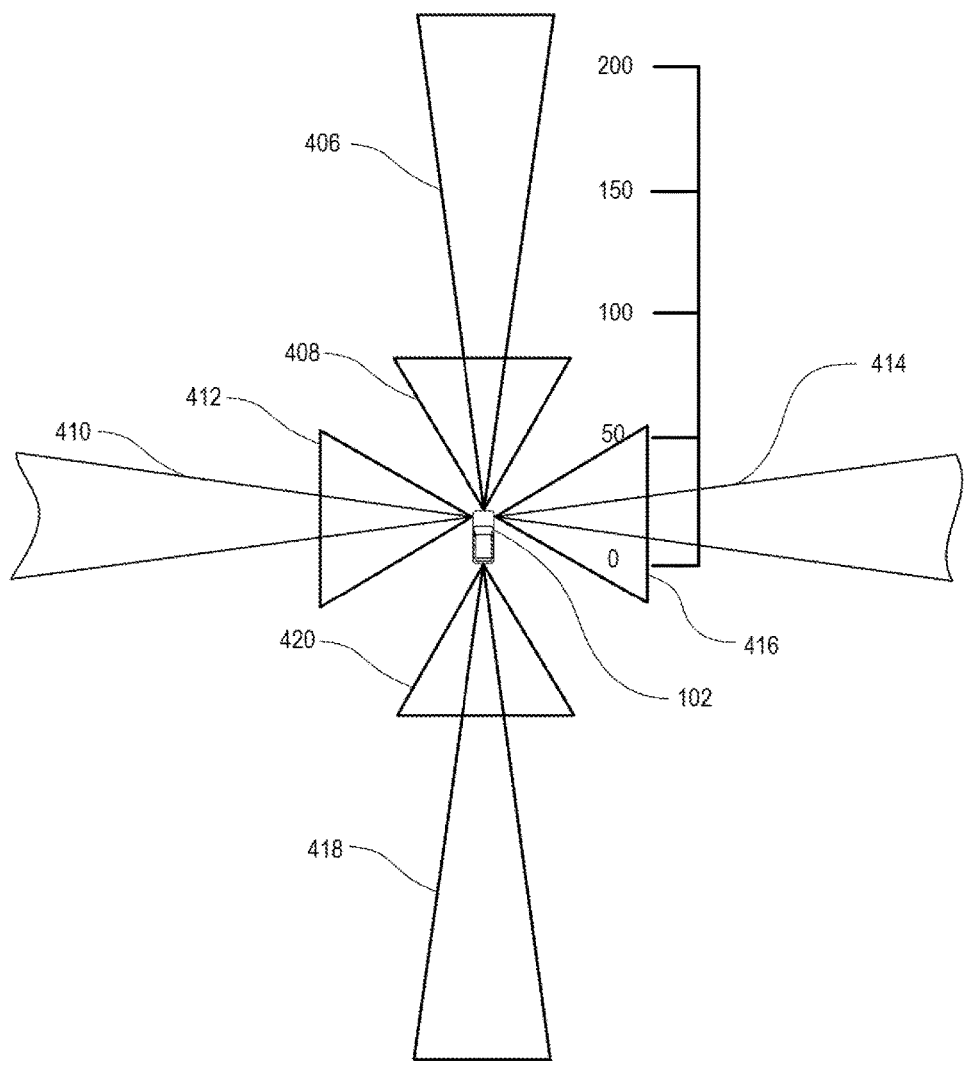

FIG. 4C depicts the approximate sensor fields 406-420 and for radar detection units 306-312, respectively, based on the fields of view for these sensors. For example, the radar detection unit 306 includes sensor fields 406 and 408. The sensor field 406 includes an approximately 18 degree horizontal field of view for approximately 200 meters, and the sensor field 408 includes an approximately 56 degree horizontal field of view for approximately 80 meters.

Similarly, the radar detection units 308-312 include the sensor fields 410/414/418 and sensor fields 412/416/420. The sensor fields 410/414/418 include an approximately 18 degree horizontal field of view for approximately 200 meters, and the sensor fields 412/416/420 include an approximately 56 degree horizontal field of view for approximately 80 meters. The sensor fields 410 and 414 extend passed the edge of FIGS. 4A and 4C.

FIG. 4D depicts the approximate sensor fields 422-424 of cameras 314-316, respectively, based on the fields of view for these sensors. For example, the sensor field 422 of the camera 314 includes a field of view of approximately 30 degrees for approximately 200 meters, and sensor field 424 of the camera 316 includes a field of view of approximately 60 degrees for approximately 100 meters.

In general, an autonomous vehicle 102 may include sonar devices, stereo cameras, a localization camera, a laser, and a radar detection unit each with different fields of view. The sonar may have a horizontal field of view of approximately 60 degrees for a maximum distance of approximately 6 meters. The stereo cameras may have an overlapping region with a horizontal field of view of approximately 50 degrees, a vertical field of view of approximately 10 degrees, and a maximum distance of approximately 30 meters. The localization camera may have a horizontal field of view of approximately 75 degrees, a vertical field of view of approximately 90 degrees and a maximum distance of approximately 10 meters. The laser may have a horizontal field of view of approximately 360 degrees, a vertical field of view of approximately 30 degrees, and a maximum distance of 100 meters. The radar may have a horizontal field of view of 60 degrees for the near beam, 30 degrees for the far beam, and a maximum distance of 200 meters. Hence, the autonomous vehicle 102 may be configured with any arrangement of sensors having different fields of view, ranges, and sensor fields, and each of these sensors may capture one or more raw images for use by the object detector 130 to detect the various objects near and around the autonomous vehicle 102.

In addition to the sensors 146 described above, the autonomous driving computer system 144 may also use input from sensors found in non-autonomous vehicles. As examples, these sensors may include tire pressure sensors, engine temperature sensors, brake heat sensors, break pad status, tire tread sensors, fuel sensors, oil level and quality sensors, air quality sensors (for detecting temperature, humidity, or particulates in the air), etc.

The data provided by the sensors 146 may be processed by the autonomous driving computer system 144 in real-time. In this context, the sensors 146 may continuously update their output to reflect the environment being sensed at or over a range of time, and continuously or as demanded. The sensors 146 may provide the updated output to the autonomous driving computer system 144 so that it can determine whether the autonomous vehicle's 102 then-current direction or speed should be modified in response to the sensed environment.

Referring back to FIG. 1, the autonomous vehicle 102 may also include an electronic representation of a driving environment for maneuvering in the driving environment, and for determining whether there are one or more objects proximate to the autonomous vehicle 102 in the driving environment. For example, autonomous driving computer system 144 may include detailed map information 114 that defines one or more driving environments. The detailed map information 114 may include various maps that identify the shape and elevation of roadways, lane lines, intersections, crosswalks, speed limits, traffic signals, buildings, signs, real time traffic information, or other such objects and information. The detailed map information 114 may further include explicit speed limit information associated with various roadway segments. The speed limit data may be entered manually or scanned from previously taken images of a speed limit sign using, for example, optical-character recognition. In addition, the detailed map information 114 may include three-dimensional terrain maps incorporating one or more of the objects (e.g., crosswalks, intersections, lane lines, etc.) listed above.

The detailed map information 114 may also include lane marker information identifying the location, elevation, and shape of lane markers. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line.

The autonomous vehicle 102 may also include persistent data for detecting objects and determining whether one or more of the sensor is experiencing (has experienced) degradation. For example, the data 112 may include one or more sensor parameters 148 used by the processor 106 to determine when a sensor has detected an object, and the type of object detected by the sensor. More particularly, the sensor parameters 148 may define an arrangement of pixels, laser points, intensity maps, etc., that should be considered an object. The sensor parameters 148 may also define how an object is to be classified (e.g., "vehicle," "pedestrian," "k-rail concrete barrier," etc.).

Each of the sensors 146 of the autonomous vehicle 102 may be associated with a corresponding set of the sensor parameters 148. Thus, the one or more camera(s) may be associated with camera parameters, the one or more laser(s) may be associated with laser parameters, and the one or more radar detection unit(s) may be associated with radar parameters. Examples of camera parameters may include the minimal brightness of a pedestrian, the minimum pixel size of a car object, the minimum width of a car object, and other such parameters. Examples of laser parameters may include the height of a pedestrian, the length of a car object, an obstacle detection threshold, and other such parameters. Examples of radar parameters may include minimum distance to an object, a delay threshold for detecting an object, the velocity of a detected object, the height of a pedestrian, and other such parameters.

In detecting vehicles in various driving environments, the data 112 may include vehicle data 116 that defines one or more parameters for classifying a vehicle. Classifications of vehicle may include such classifications as "passenger car," "bicycle," "motorcycle," and other such classifications. The parameters defined by the vehicle data 116 may inform the autonomous driving computer system 144 as to the type of vehicle detected by a given sensor. For example, the vehicle data 116 may include parameters that define the type of vehicle when the vehicle is detected by one or more of the camera sensors, one or more of the laser sensors, and so forth.

Vehicles may be identified through a vehicle detection algorithm 124, which the processor 106 may use to classify vehicles based on various characteristics, such as the size of the vehicle (bicycles are larger than a breadbox and smaller than a car), the speed of the vehicle (bicycles do not tend to go faster than 40 miles per hour or slower than 0.1 miles per hour), and other such characteristics. In addition, the vehicle may be classified based on specific attributes of the vehicle, such as information contained on a license plate, bumper sticker, or logos that appear on the vehicle.

The vehicle data 116 may also include state, positional, and/or trajectory information collected by the autonomous driving computer system 144 when a vehicle is detected. The autonomous driving computer system 144 may collect the state and/or positional information about a detected object such as a vehicle to assist in the determination of the detected vehicle's trajectory. The vehicle trajectory for the detected vehicle may define the direction and speed that a vehicle has when in a given driving environment. The vehicle trajectory may also define the past positions, directions, and speed that the detected vehicle had while in the driving environment.

The autonomous vehicle 102 may generate state information about detected objects such as other vehicles regardless of whether the autonomous vehicle 102 is operating in an autonomous mode or a non-autonomous mode. Thus, whether the autonomous vehicle 102 is operating by itself or has a driver, the autonomous vehicle 102 may collect state and object information, for example, in order to determine the aforementioned vehicle trajectories.

The instructions 110 may also include a sensor degradation detection algorithm 124 for identifying sensor degradation in one or more of the sensors 146. As previously discussed, and described in more detail below, determining whether a sensor is experiencing (or has experienced) degradation may include comparing observed sensor readings (e.g., position, velocity, trajectory, etc.) of moving objects with expected sensor readings of those moving objects and/or comparing observed sensor readings (e.g., geometry, intensity values, etc.) of static objects with expected sensor readings of those static objects.

Figure 2:
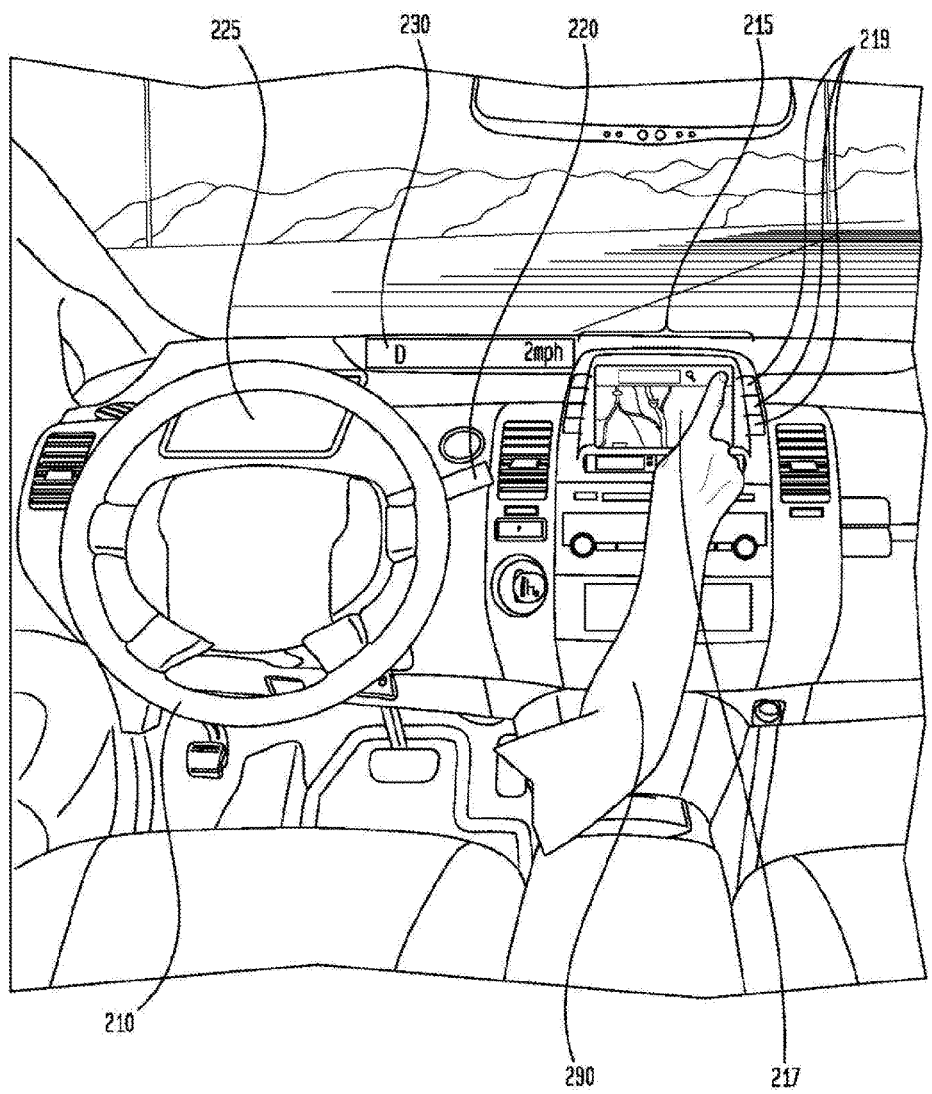
FIG. 2 illustrates an example of an interior of the autonomous vehicle according to aspects of the disclosure

FIG. 2 illustrates an example of an interior of the autonomous vehicle 102 according to aspects of the disclosure. The autonomous vehicle 102 may include all of the features of a non-autonomous vehicle, for example: a steering apparatus, such as steering wheel 210; a navigation display apparatus, such as navigation display 215; and a gear selector apparatus, such as gear shifter 220. The vehicle 102 may also have various user input devices, such as gear shifter 220, touch screen 217, or button inputs 219, for activating or deactivating one or more autonomous driving modes and for enabling a driver or passenger 290 to provide information, such as a navigation destination, to the autonomous driving computer 106.

The autonomous vehicle 102 may also include one or more additional displays. For example, the autonomous vehicle 102 may include a display 225 for displaying information regarding the status of the autonomous vehicle 102 or its computer. In another example, the autonomous vehicle 102 may include a status indicating apparatus such as status bar 230, to indicate the current status of vehicle 102. In the example of FIG. 2, the status bar 230 displays "D" and "2 mph" indicating that the autonomous vehicle 102 is presently in drive mode and is moving at 2 miles per hour. In that regard, the autonomous vehicle 102 may display text on an electronic display, illuminate portions of the autonomous vehicle 102, such as the steering wheel 210, or provide various other types of indications.

Figure 5:
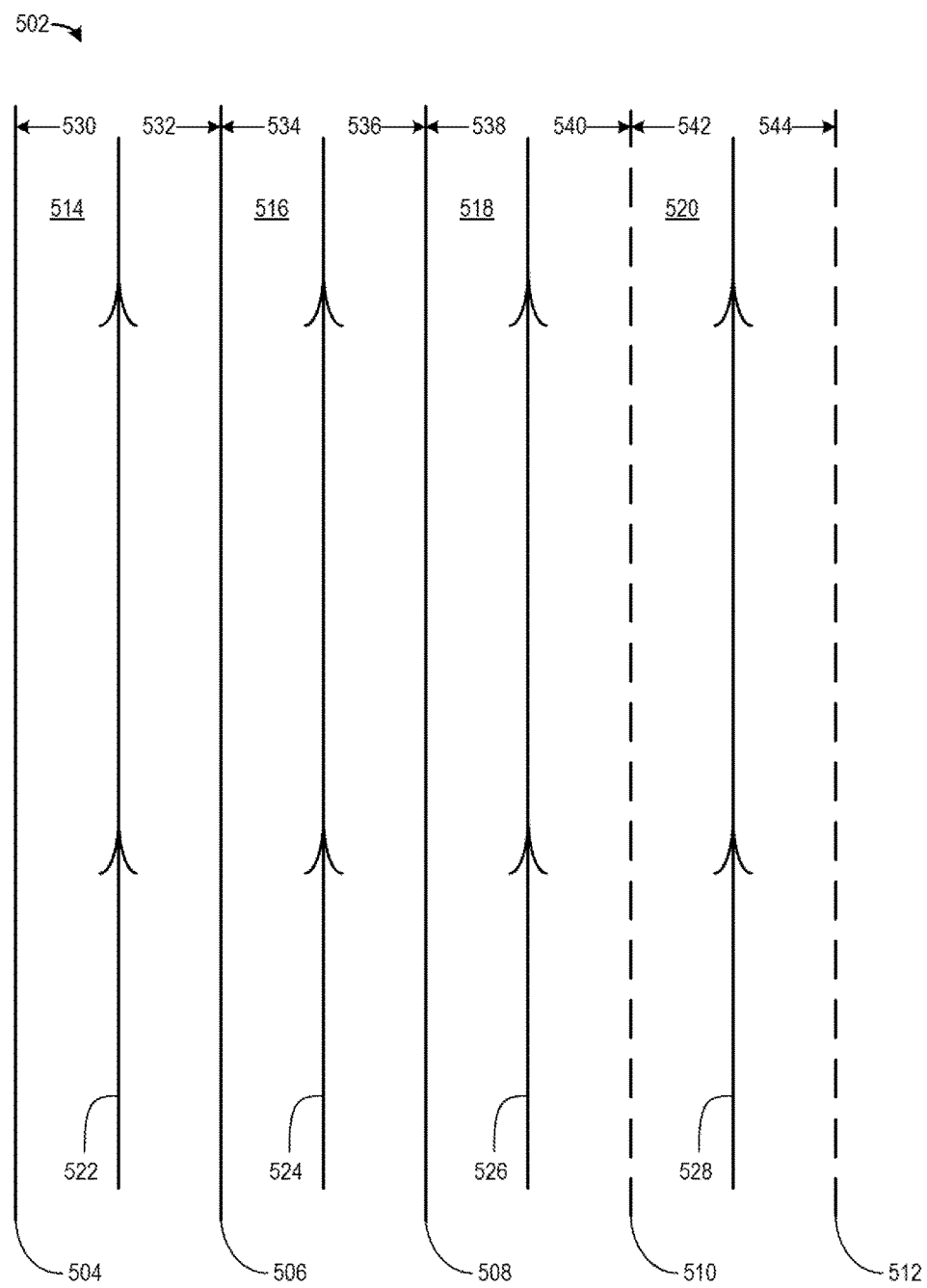
FIG. 5 illustrates an example of detailed map information that may be stored by the autonomous vehicle in accordance with aspects of the disclosure.

FIG. 5 illustrates an example of a portion of a detailed map 502 that may represent the driving environment of the autonomous vehicle 102. The detailed map 502 may be retrieved or referenced by the autonomous vehicle 102 from the detailed map information 114 based on a detected position of the autonomous vehicle 102. The detailed map 502 may be stored as part of the detailed map information 114.

The detailed map 502 may further represent a section of a road, such as highway, parkway, etc., and may include lane information such as information about solid lane lines 504-508 and broken lane lines 510-512. These lane lines may define lanes 514-520. Each of the lanes 514-520 may be associated with a respective centerline rail 522-528 which may indicate the direction in which a vehicle should generally travel in the respective lane. For example, a vehicle may follow centerline rail 522 when driving in lane 514. In this example, the lane 514 may be bounded by a left lane line 504 and the right lane line 506. Similarly, the lane 516 may be bounded by the left lane line 506 and the right lane line 508, the lane 518 may be bounded by the left lane line 508 and the right lane line 510, and the lane 520 may be bounded by the left lane line 510 and the right lane line 512.

Each of the lanes 514-520 may be bounded by corresponding lane edges. Thus, lane 514 may be bounded by edges 530,532, lane 516 may be bounded by edges 534,536, lane 518 may be bounded by edges 538,540 and lane 520 may be bounded by edges 542,544.

In the example shown in FIG. 5, the detailed map information 114 may be depicted as an image-based map. However, the detailed map information 114 need not be entirely or completely image-based (e.g., raster-based). For example, the detailed map information 114 may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The detailed map information 114, such as that depicted in FIG. 5, may be loaded into the memory 108 of the autonomous vehicle 102 at a predetermined time. In one embodiment, the detailed map information 114 may be loaded into the memory 108 of the autonomous vehicle 102 on a daily basis. Alternatively, or in addition, the detailed map information 114 may be loaded into the memory 108 at other predetermined times, such as on a monthly or weekly basis.

As previously discussed, the autonomous driving computer system 144 may include instructions 110 having various algorithms for detecting and identifying objects in a driving environment and for determining whether one or more of the sensors 126 is experiencing, or has experienced, sensor degradation based on the detected objects.

Figure 6:
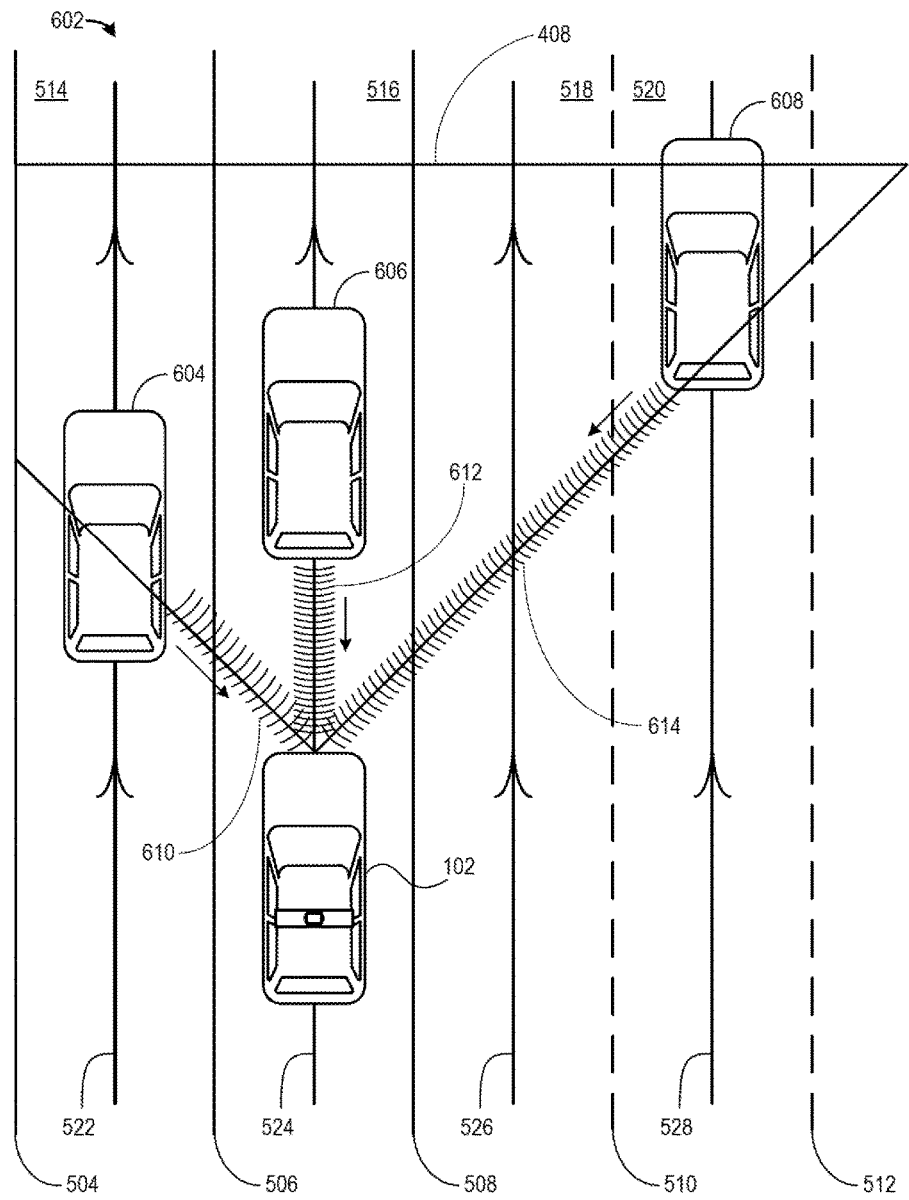
FIG. 6 illustrates an example of the autonomous vehicle obtaining initial sensor readings from a radar detection unit according to aspects of the disclosure.
Figure 7:
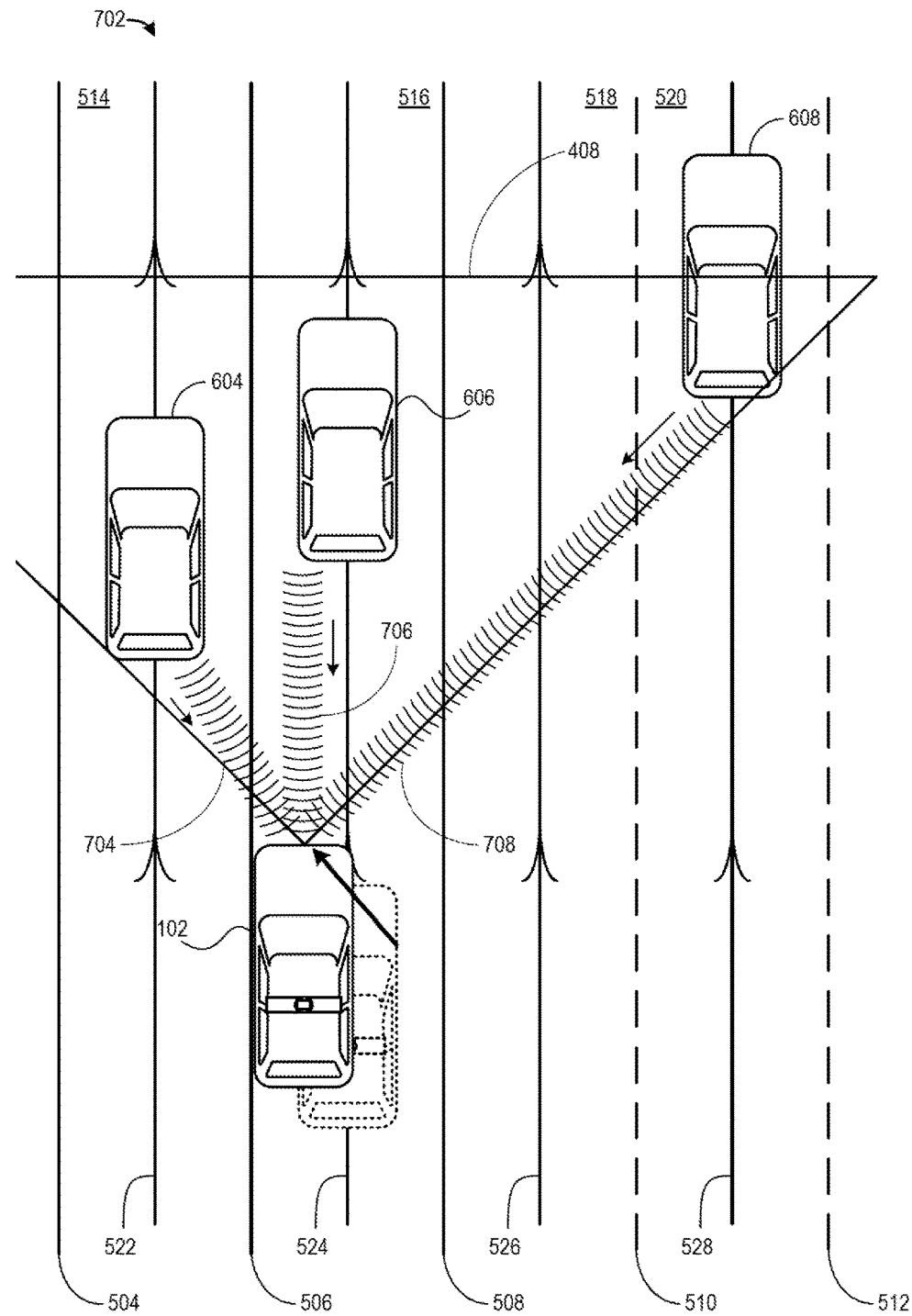
FIG. 7 illustrates an example of the autonomous vehicle obtaining sensor readings from a radar detection unit after changing the direction of travel for the autonomous vehicle according to aspects of the disclosure.

FIGS. 6-7 illustrate examples 602,702 of the autonomous vehicle 102 using non-static (i.e., moving) objects in a driving environment to identify sensor degradation or to determine whether a sensor is operating outside of normal or preferred operating parameters. In FIG. 6, the autonomous vehicle 102 may obtain initial sensor readings 610-614 from one or more detected vehicles 604-608 in a driving environment. The detailed map 502 may correspond to the driving environment of FIG. 6. In the example 602, the autonomous vehicle 102 may detect and identify one or more vehicles, such as vehicles 604-608, using the vehicle detection algorithm 124. The vehicles 604-608 may be within range of one or more of the sensor fields projected by the autonomous vehicle 102, such as the radar sensor field 408. The vehicles 604-608 may be within range of other sensor fields, but these other sensor fields have been omitted for simplicity and clarity.

In the example 602, the vehicles 604-608 and the autonomous vehicle 102 may be in various lanes of the driving environment. In particular, the vehicle 604 may be in the lane 514, the vehicle 606 may be in the lane 516, and the vehicle 608 may be in the lane 520. The autonomous vehicle 102 may be in the lane 516.

The autonomous driving computer system 144 may receive data from sensors one or more object in the autonomous vehicle's 102 surroundings. For example, the autonomous driving computer system 144 may receive data regarding the vehicles 604-608 from the radar detection unit 306 (corresponding to the radar sensor field 408 as shown in FIG. 6). The data received from the vehicles 604-608 may include sensor readings 610 corresponding to the vehicle 604, sensor readings 612 from the vehicle 606, and sensor readings 614 corresponding to the vehicle 608.

The sensor readings 610-614 received by the radar detection unit 306 may be used to establish baseline sensor readings for each of the vehicles 604-608. The autonomous driving computer system 144 may use the baseline sensor readings to determine baseline state information for one or more of the vehicles 604-608 such as an initial distance from the autonomous vehicle 102, an initial trajectory (e.g., direction of travel and speed of travel), an initial speed (either relative to the autonomous vehicle 102 and/or relative to the driving environment), and other such state information.

After determining the baseline state information for the one or more vehicles 604-608, the autonomous driving computer system 144 may then change one or more movement characteristics of the autonomous vehicle 102 by a predetermined amount.

FIG. 7 illustrates an example 702 of the autonomous driving computer system 144 changing the one or more movement characteristics of the autonomous vehicle 102. The change in the movement characteristics of the autonomous vehicle 102 may include changes to such movement characteristics as speed, heading, acceleration, deceleration, the yaw rate in which the steering wheel of the autonomous vehicle 102 is turned, and other such changes in the movement characteristics of the autonomous vehicle 102.

Changes in the movements of the autonomous vehicle 102 may be based on various predetermined amounts. For example, changes in speed may include increasing or decreasing the speed of travel by the autonomous vehicle 102 by one or two miles per hour ("MPH"), changes in acceleration or deceleration may include increasing or decreasing the speed of the autonomous vehicle 102 by a predetermined rate, such as 3.4 m/s$^2$, changes in the yaw rate may include turning the steering of the vehicle by 0.75 deg/sec, 3 deg/sec, and other similar amounts.

The autonomous driving computer system 144 may obtain second sensor readings 704-708 for the one or more autonomous vehicles 604-608 after, or during, the changes in movements to the autonomous vehicle 102. The autonomous driving computer system 144 may then determine second state information for one or more of the vehicles 604-608 based on the second sensor readings 704-708. The second state information determined from the second sensor readings 704-708 may include one or more of the parameters determined from the baseline state information. In other words, the second state information may include such information as distance from the autonomous vehicle 102, trajectory (e.g., direction of travel and speed of travel), speed (either relative to the autonomous vehicle 102 and/or relative to the driving environment), and other such state information.

The second state information may be compared with expected state information determined by the autonomous driving computer system 144. Expected state information may include state information that the autonomous driving computer system 144 would expect from the one or more vehicles 604-608 based on changes the movement characteristic(s) of the autonomous vehicle 102. For example, all other parameters remaining the same, should the speed of the autonomous vehicle 102 decrease, the autonomous driving computer system 144 would expect that the distance between the autonomous vehicle 102 and the previously detected vehicles 604-608 would increase by an amount corresponding to the decrease in speed of the autonomous vehicle 102.

The autonomous driving computer system 144 may determine the expected state information for the one or more vehicles 604-608. The determination of the expected state information may be based on the baseline state information for each of the one or more vehicles 604-608 and the changes in the movement characteristics of the autonomous vehicle 102. For example, where the baseline state information includes an initial distance, such as the initial distance of the vehicle 604, from the autonomous vehicle 102, and the change in the movement characteristics of the autonomous vehicle 102 include changing the speed of the autonomous vehicle 102, the expected state information may include an expected distance of the vehicle 604 from the autonomous vehicle 102 determined based on the initial distance of the vehicle 604 and the change in speed of the autonomous vehicle 102. As another example, where the baseline state information includes an initial speed, such as an initial speed of the vehicle 604, and the change in the movement characteristics of the autonomous vehicle 102 include changing the speed of the autonomous vehicle 102, the expected state information may include an expected speed of the vehicle 604 based on the initial speed of the vehicle 604 and the change in speed of the autonomous vehicle 102.

By comparing the second state information with the expected state information, the autonomous driving computer system 144 may determine one or more deviation values. For example, where the second state information and expected state information include distance, speed, trajectory, and so forth, there may be a corresponding distance deviation value, speed deviation value, trajectory deviation value, etc. Furthermore each of the values may have a magnitude and sign. For example, where an expected distance value of the vehicle 604 is 20 meters, and the determined distance value of the vehicle 604 (based on the second state information) is 10 meters, the distance deviation value may be "−10 meters." In this example, the distance deviation value indicates that the radar detection unit is detecting the vehicle 604 closer to the autonomous vehicle 102 than the autonomous driving computer system 144 predicted.

Moreover, the autonomous driving computer system 144 may establish one or more deviation threshold values for the various types of state information. One or more of the deviation threshold values may be stored in the data 112.

Accordingly, there may be a distance deviation threshold value (e.g., +/−2 meters), a speed deviation threshold value (e.g., +/−2 MPH), a yaw rate deviation threshold value (e.g., +/−0.4 deg/sec), and other such threshold values. Where one or more of the determined deviation values exceed a corresponding deviation threshold value of the same type, the autonomous driving computer system 144 may identify sensor degradation in the sensor (i.e., the radar detection unit 306) or determine that the sensor is operating outside of normal or preferred operational parameters. In other words, the autonomous driving computer system 144 may determine that the sensor (i.e., the radar detection unit 306) is faulty.

In addition, depending on the severity or magnitude of the difference in the deviation threshold value and the corresponding determined deviation value, or the number of deviation threshold values that are exceeded, the autonomous driving computer system 144 may perform a variety of actions. For example, where one deviation threshold value is exceeded, the autonomous driving computer system 144 may display a warning to a passenger. Where two deviation threshold value types are exceeded (e.g., distance and speed, yaw and distance, etc.), the autonomous driving computer system 144 may request that a passenger take control of the autonomous vehicle 102. Similarly, where a difference in a deviation threshold value and the corresponding determined deviation value exceeds a predetermined amount, the autonomous driving computer system 144 may display a warning, request a passenger take control, and other actions or combination of actions.

Furthermore, the autonomous driving computer system 144 may correlate the identification of sensor degradation with the detailed map information 114 to determine where or when the sensor may have begun operating outside of normal or preferred operating parameters. For example, the autonomous driving computer system 144 may record the time (e.g., "2:43 P.M," "1450", etc.) and/or place (e.g., latitude/longitude) where it identifies sensor degradation in a sensor (i.e., one or more deviation values exceed one or more deviation thresholds). Based on this recordation of time and/or place, the detailed map information 114 may be cross-referenced to determine if there were any environmental factors (e.g., speed bumps, known potholes, known construction, etc.) that may have affected the operations of the faulty sensor.

Figure 8:
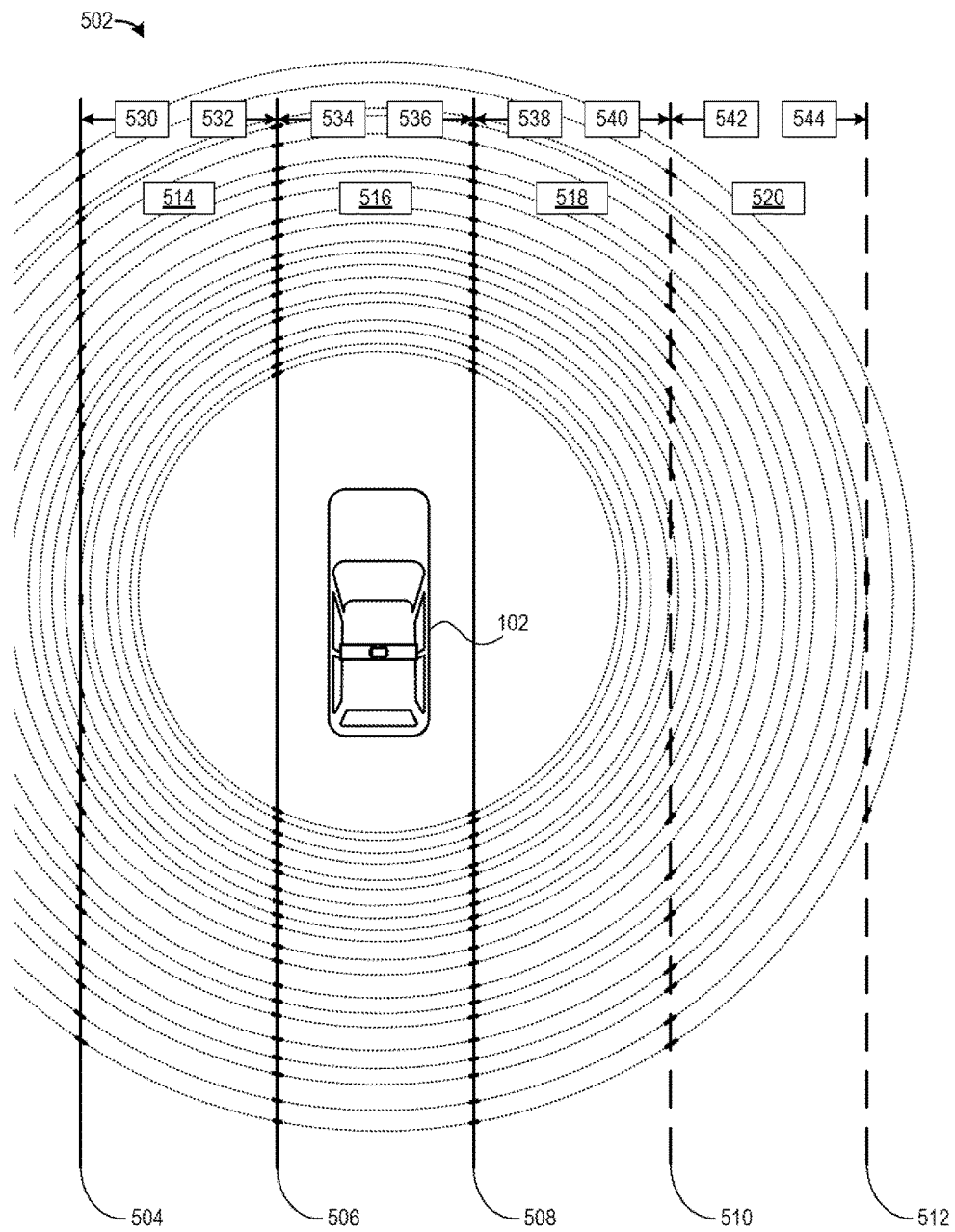
FIG. 8 illustrates an example of the autonomous vehicle obtaining sensor readings from a laser sensor according to aspects of the disclosure.

In another embodiment of determining sensor degradation, the autonomous vehicle 102 may reference one or more static objects in the driving environment. FIG. 8 illustrates an example 802 of the autonomous vehicle 102 determining whether a sensor, in this example, the laser sensor 304, is operating outside of normal or preferred operating parameters using static features in the driving environment. In particular, the autonomous driving computer system 144 may leverage the detection of one or more of the lane lines 504-512 and/or lane edges 530-544 in determining whether there is sensor degradation in the laser sensor 304.

The example 802 illustrates various concentric circles emanating from the laser sensor 304 of the autonomous vehicle 102. Each of the concentric circles may correspond to a series of data points generated by a laser beam projected from the laser sensor 304. In addition, where a laser beam strikes a lane line edge, the autonomous driving computer system 144 may record the detection of the lane line edge as a laser point, including the position (latitude, longitude, and elevation) of the laser point, and the intensity of the reflection from the laser point along the lane line edge. In addition, a composite of the detected points along the lane line edge may be formulated in order to determine the geometry (width, height, length, etc.) of the lane line. Although the example 802 illustrates detecting lane lines and lane line edges, the determination of geometry, position, and laser intensity may also be performed with respect to other static objects in the driving environment, such as billboards, k-rail concrete barriers, and other such static objects.

To determine whether the laser sensor 304 is operating within normal or preferred operating parameters, the autonomous driving computer system 144 may compare recorded laser points of the laser sensor 304 (e.g., laser point positions, laser point intensities, etc.) with the laser points of the detailed map 502 of FIG. 5. Comparing recorded laser points with laser points of the detailed map 502 may include comparing laser point positions (latitude and/or longitude, distance from the autonomous vehicle 102, etc.), light intensities, laser point elevations, and other such information.

From this comparison, the autonomous driving computer system 144 may obtain one or more map deviation values that indicate the number, or percentage, of recorded laser points that are different from the laser points associated with the detailed map. For example, a comparison may yield that % 5 of the recorded laser points are different (in position, light intensity, elevation, etc.) from the laser points associated with the detailed map. A comparison may also include more granular information, such as the number or percentage of laser points that differ in position, elevation, light intensity, and so forth.

Figure 9:
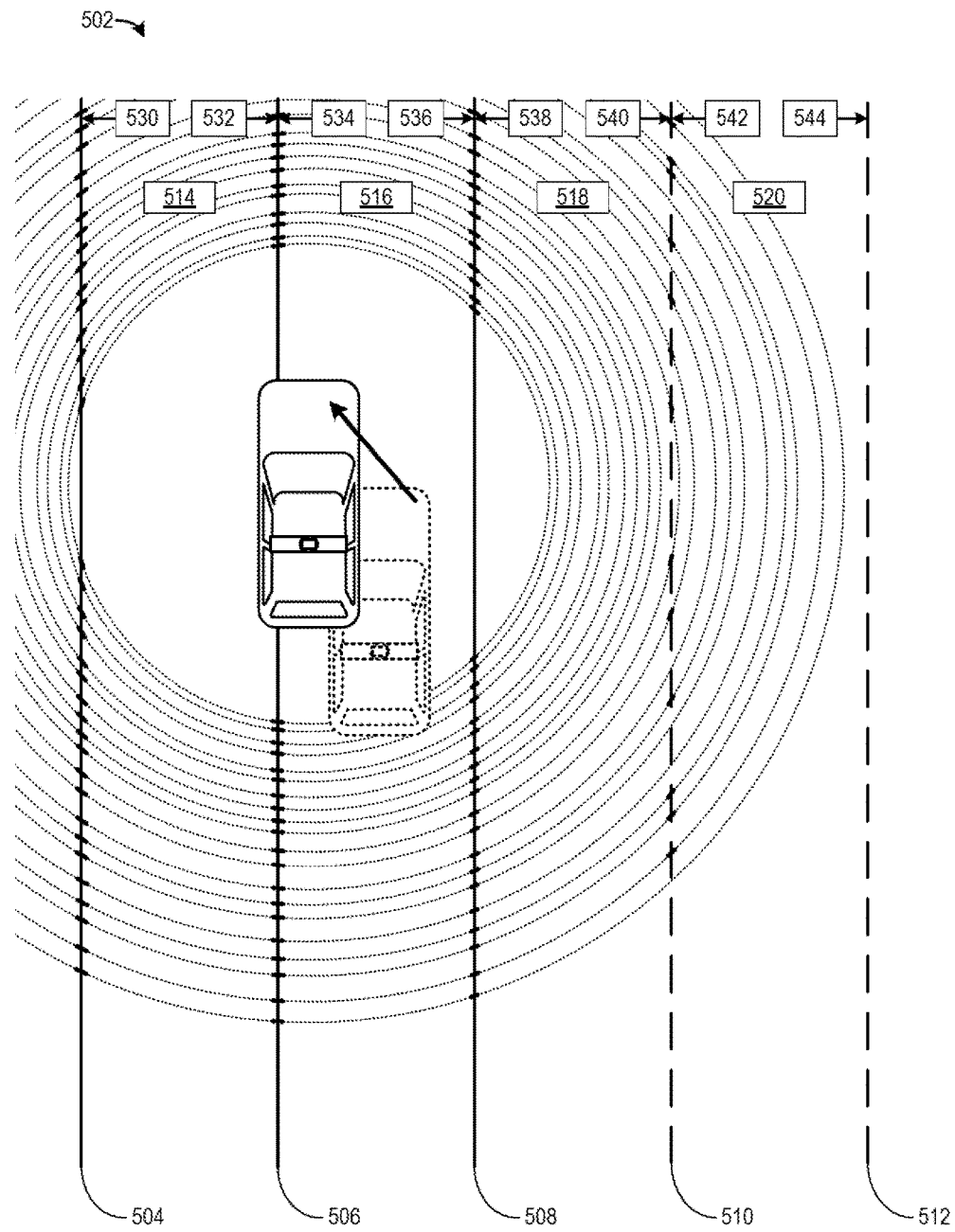
FIG. 9 illustrates an example of the autonomous vehicle obtaining sensor readings from the laser sensor after changing the direction of travel for the autonomous vehicle according to aspects of the disclosure.

FIG. 9 illustrates an example 902 of obtaining a second set of recorded laser points for use in identifying sensor degradation in the laser sensor 304. In particular, the example 902 illustrates obtaining the second set of recorded laser points based on changes in one or more movement characteristics of the autonomous vehicle 102. In this regard, the autonomous driving computer system 144 may use the recorded laser points of FIG. 8 as a baseline set of recorded laser points, and then, based on changes in the movement characteristics of the autonomous vehicle 102 (e.g., speed, heading, position, etc.), determine an expected set of laser points. The autonomous driving computer system 144 may then compare the expected set of laser points (determined from example 802) with the second set of recorded laser points. Based on this comparison, the autonomous driving computer system 144 may determine a number of movement deviation values, including a number or percentage of the laser points from the second set of recorded laser points that are different from the expected set of laser points. Comparing the second set of recorded laser points with the expected set of laser points may include comparing position (e.g., latitude, longitude, elevation), light intensity, and, where the autonomous driving computer system 144 identifies an object from a group of laser points, geometry (e.g., height, width, depth, etc.)

Having determined one or more map and/or movement deviation values (e.g., positional deviation values, light intensity deviation values, etc.), the autonomous driving computer system 144 may compare the map and/or movement deviation values with one or more corresponding deviation thresholds values. Thus, there may be a positional deviation threshold values, an elevation deviation threshold value, a light intensity threshold value, and other such threshold values. Where one or more of the determined deviation values exceed the corresponding deviation threshold values, the autonomous driving computer system 144 may identify sensor degradation in the sensor (i.e., the laser sensor 304) or determine that the sensor is operating outside of normal or preferred operational parameters.

In addition, depending on the severity or magnitude of the difference in a deviation threshold value and a corresponding deviation value, or the number of deviation threshold values that are exceeded, the autonomous driving computer system 144 may perform a variety of actions. For example, where one deviation threshold value is exceeded, the autonomous driving computer system 144 may display a warning to a passenger. Where two deviation threshold values are exceeded, the autonomous driving computer system 144 may request that a passenger take control of the autonomous vehicle 102. Similarly, where a difference in a deviation threshold value and the deviation value exceeds a predetermined amount, the autonomous driving computer system 144 may display a warning, request a passenger take control, and other actions or combination of actions.

Figure 10:
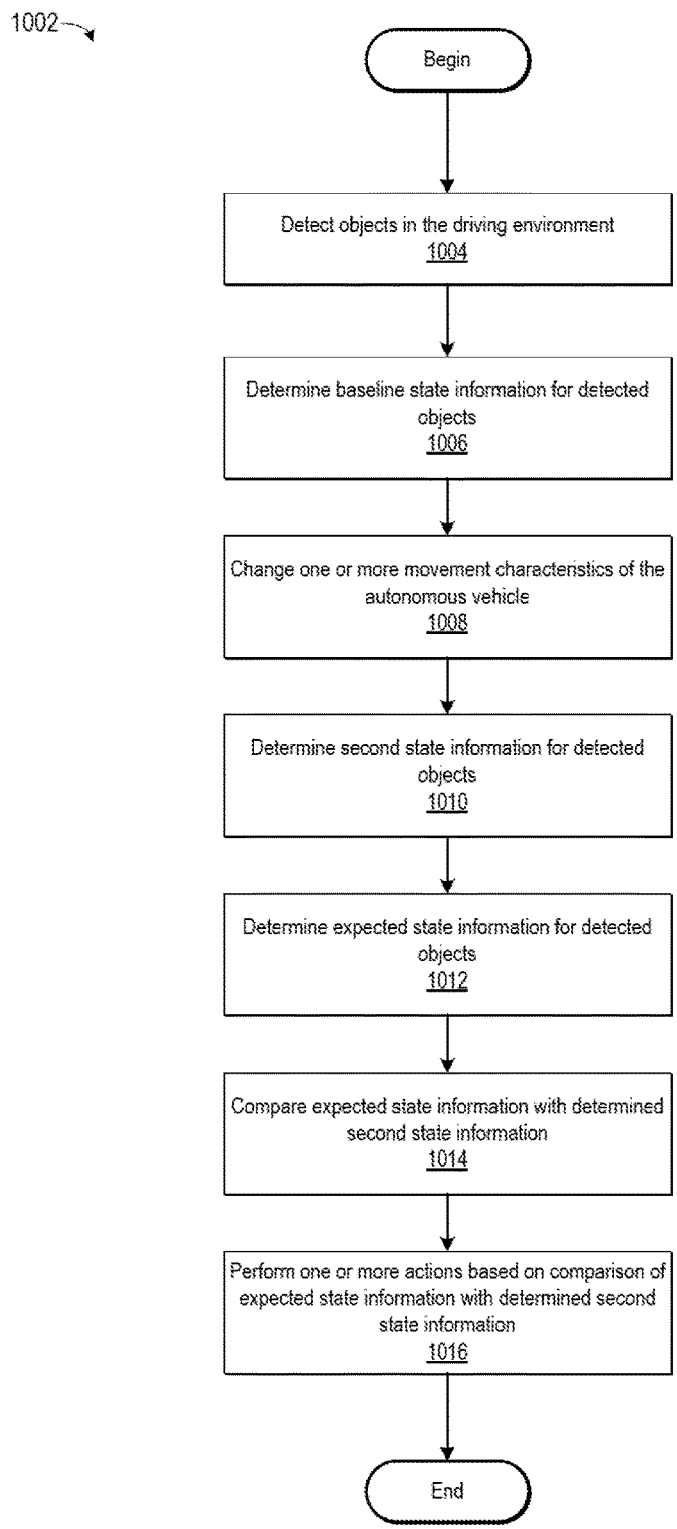
FIG. 10 illustrates an example of logic flow for determining sensor degradation for one or more sensors of the autonomous vehicle according to aspects of the disclosure.

FIG. 10 illustrates an example of logic flow 1002 for determining whether a sensor is faulty or sensor degradation has occurred according to aspects of the disclosure. Initially, the autonomous driving computer system 144 may detect one or more objects in a driving environment (Block 1004) of the autonomous vehicle 102. The detection may be performed with one or more of the sensors of the autonomous vehicle 102, such as the radar detection unit 306, or other sensor.

The autonomous driving computer system 144 may then determine baseline state information for the detected objects (Block 1006). The baseline state information may include distance, position, heading, trajectory, speed, and other such state information.

The autonomous driving computer system 144 may then change one or more movement characteristics of the autonomous vehicle 102 (Block 1008). Changing one or more of the movement characteristics of the autonomous vehicle 102 may include changes to speed, acceleration or deceleration rate, changes in heading, changes in the yaw rate, and other such changes.

The autonomous driving computer system 144 may then determine second state information for the detected objects (Block 1010). This may include determining one or more corresponding parameter values previously determined for the baseline state information.

The autonomous driving computer system 144 may also determine expected state information (Block 1012). Determining the expected state information may be based on the baseline state information and the changes to the movement characteristics of the autonomous vehicle 102.

The autonomous driving computer system 144 may then compare the expected state information with the determined second state information (Block 1014). The comparison of the expected state information with the determined second state information may yield one or more deviation values. These deviation values may then be compared with one or more corresponding deviation thresholds. The autonomous driving computer system 144 may be configured to perform one or more actions (e.g., display a warning, request a passenger take control, etc.) based on the magnitude in difference between the deviation value and the deviation threshold value, based on the number of deviation threshold values that are exceeded, or combinations thereof (Block 1016).

In this manner, the autonomous driving computer system 144 may identify sensor degradation in a sensor or whether a sensor is operating outside of normal or preferred operating parameters based on objects in the driving environment of the autonomous vehicle 102. Determining sensor degradation in the sensors of the autonomous vehicle 102 may include determining sensor degradation in different types of sensors. Moreover, the autonomous driving computer system 144 may be configured to perform this determination using moving objects, such as vehicles, and non-moving objects, such as lane lines, k-rail concrete barriers, billboards, and other such objects. As the sensor degradation detection methods and system disclosed herein may be used to determine whether and/or when a sensor is experiencing a problem, the safety and confidence of the autonomous vehicle in navigating a driving environment is enhanced.

Although aspects of this disclosure have been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of this disclosure as defined by the appended claims. Furthermore, while certain operations and functions are shown in a specific order, they may be performed in a different order unless it is expressly stated otherwise.

The invention claimed is:

1. A system for determining operating status of a sensor, the system comprising:
   the sensor configured to generate sensor data including data for a first vehicle in a driving environment of a second vehicle; and
   one or more processors, in communication with the sensor, the one or more processors being configured to:
      control the second vehicle in an autonomous driving mode according to at least one movement characteristic;
      receive the sensor data from the sensor;
      compare the sensor data with expected state information for the first vehicle based on the at least one movement characteristic; and
      use the comparison to determine the operating status of the sensor.

2. The system of claim 1, wherein determining the operating status is further based on at least one static object included in the sensor data.

3. The system of claim 1, wherein the one or more processors are further configured to use the comparison to determine a deviation value, and wherein the deviation value is further used to determine the operating status of the sensor.

4. The system of claim 3, wherein the one or more processors are further configured to determine if the deviation value meets a threshold value, and wherein the determination is further used to determine the operating status.

5. The system of claim 4, wherein when the determination includes that the deviation value not meets the threshold value, and the operating status corresponds to the sensor being degraded.

6. The system of claim 3, wherein the one or more processors are further configured to determine a second deviation value, and wherein the second deviation value is further used to determine the operating status of the sensor.

7. The system of claim 1, wherein the one or more processors are further configured to, in response to determining the operating status of the sensor, requesting that a driver take control the vehicle.

8. The system of claim 1, further including a display, and wherein the one or more processors are further configured to, in response to determining the operating status of the sensor, displaying a notification on the display indicating degradation of the sensor.

9. The system of claim 1, wherein the expected state information corresponds to state information for the first vehicle that would be expected based on a change to the at least one movement characteristic of the second vehicle.

10. The system of claim 9, wherein the expected state information corresponds to an expected change in distance between the first vehicle and the second vehicle.

11. The method of claim 10, wherein the movement characteristic relates to a speed of the second vehicle and the change corresponds to a change in the speed.

12. The system of claim 9, wherein the movement characteristic relates to a speed of the second vehicle and the change corresponds to a change in the speed.

13. The system of claim 1, further comprising the second vehicle.

14. A method for determining operating status of a sensor, the method comprising:
  receiving, by one or more processors, sensor data from the sensor, the sensor data including data for a first vehicle in a driving environment of a second vehicle;
  controlling, by the one or more processors, a second vehicle in an autonomous driving mode according to at least one movement characteristic;
  comparing, by the one or more processors, the sensor data with expected state information for the first vehicle based on the at least one movement characteristic; and
  using, by one or more processors, the comparison to determine an operating status of the sensor.

15. The method of claim 14, wherein determining the operating status is further based on at least one static object included in the sensor data.

16. The method of claim 14, further comprising using the comparison to determine a deviation value, and wherein the deviation value is further used to determine the operating status of the sensor.

17. The method of claim 16, further comprising determining if the deviation value meets a threshold value, and wherein the determination is further used to determine the operating status.

18. The method of claim 17, wherein when the determination includes that the deviation value not meets the threshold value, and the operating status corresponds to the sensor being degraded.

19. The method of claim 16, wherein the one or more processors are further configured to determine a second deviation value, and wherein the second deviation value is further used to determine the operating status of the sensor.

20. The method of claim 14, wherein the expected state information corresponds to state information for the first vehicle that would be expected based on a change to the at least one movement characteristic of the second vehicle.

* * * * *